May 7, 1957  H. W. KLEIST  2,791,102
REFRIGERATED CARS
Filed Sept. 10, 1954  4 Sheets-Sheet 2
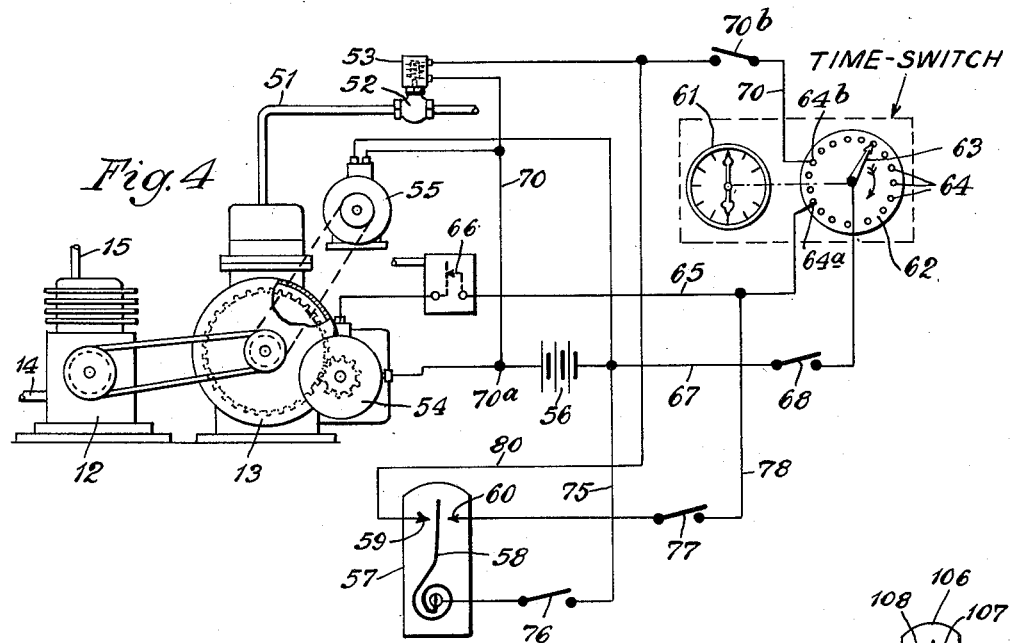
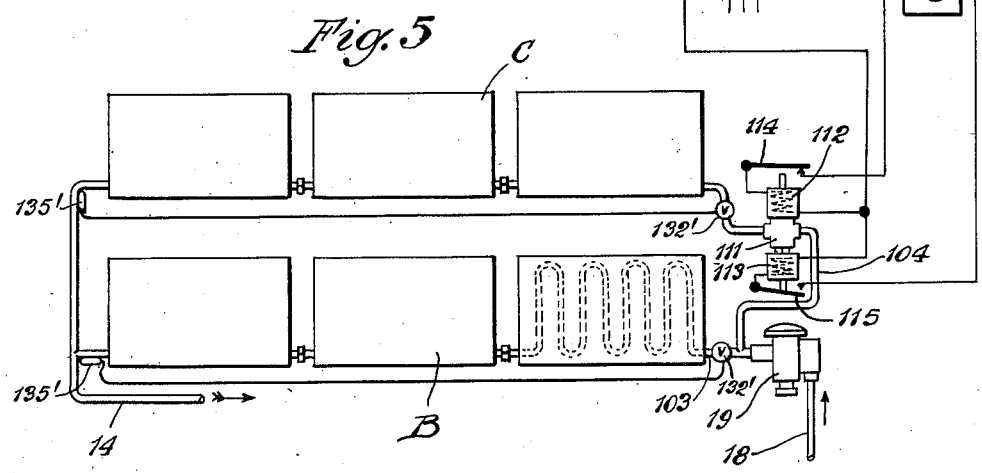
Inventor
Herman W. Kleist
by Parker & Carter
Attorneys

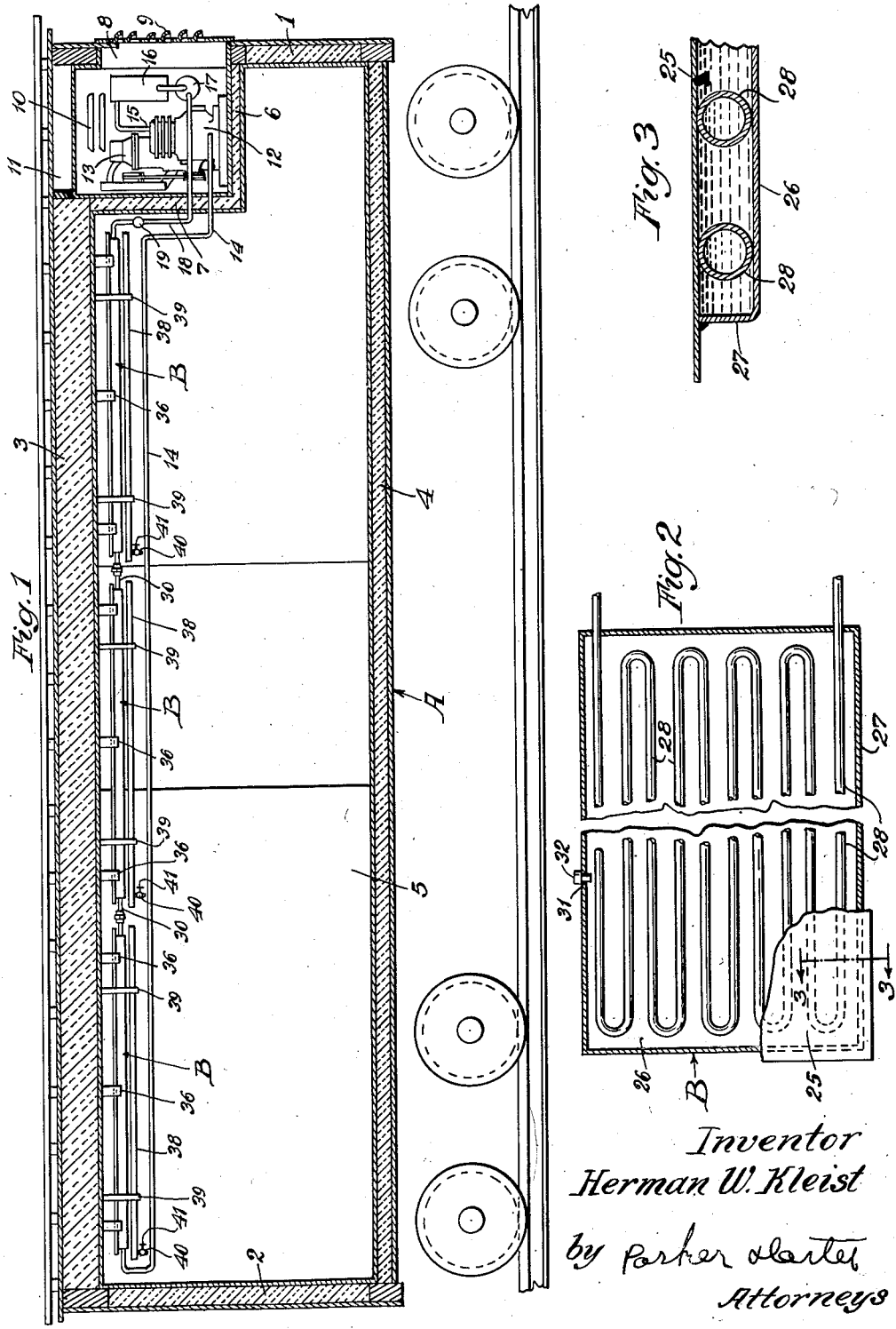

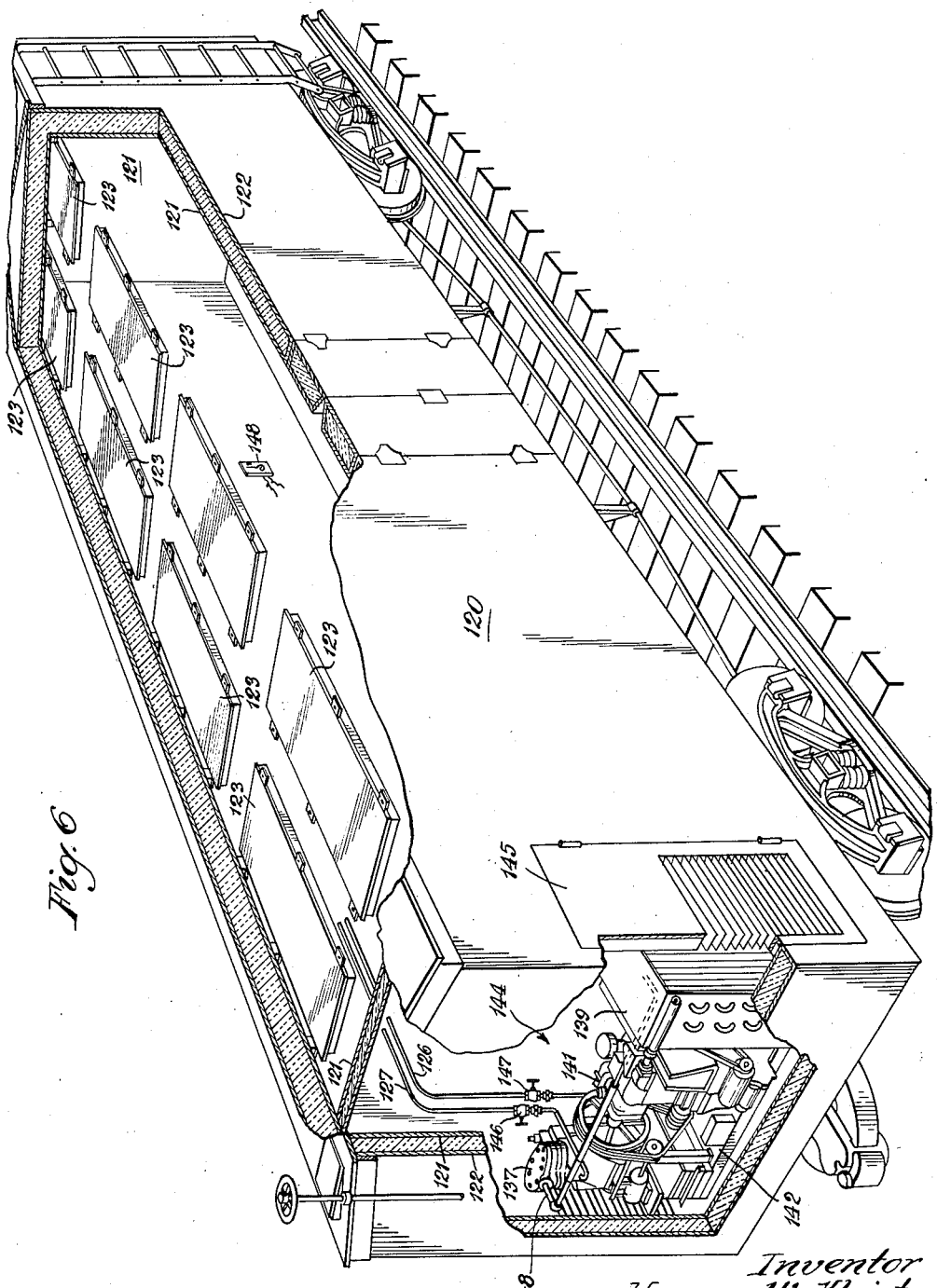

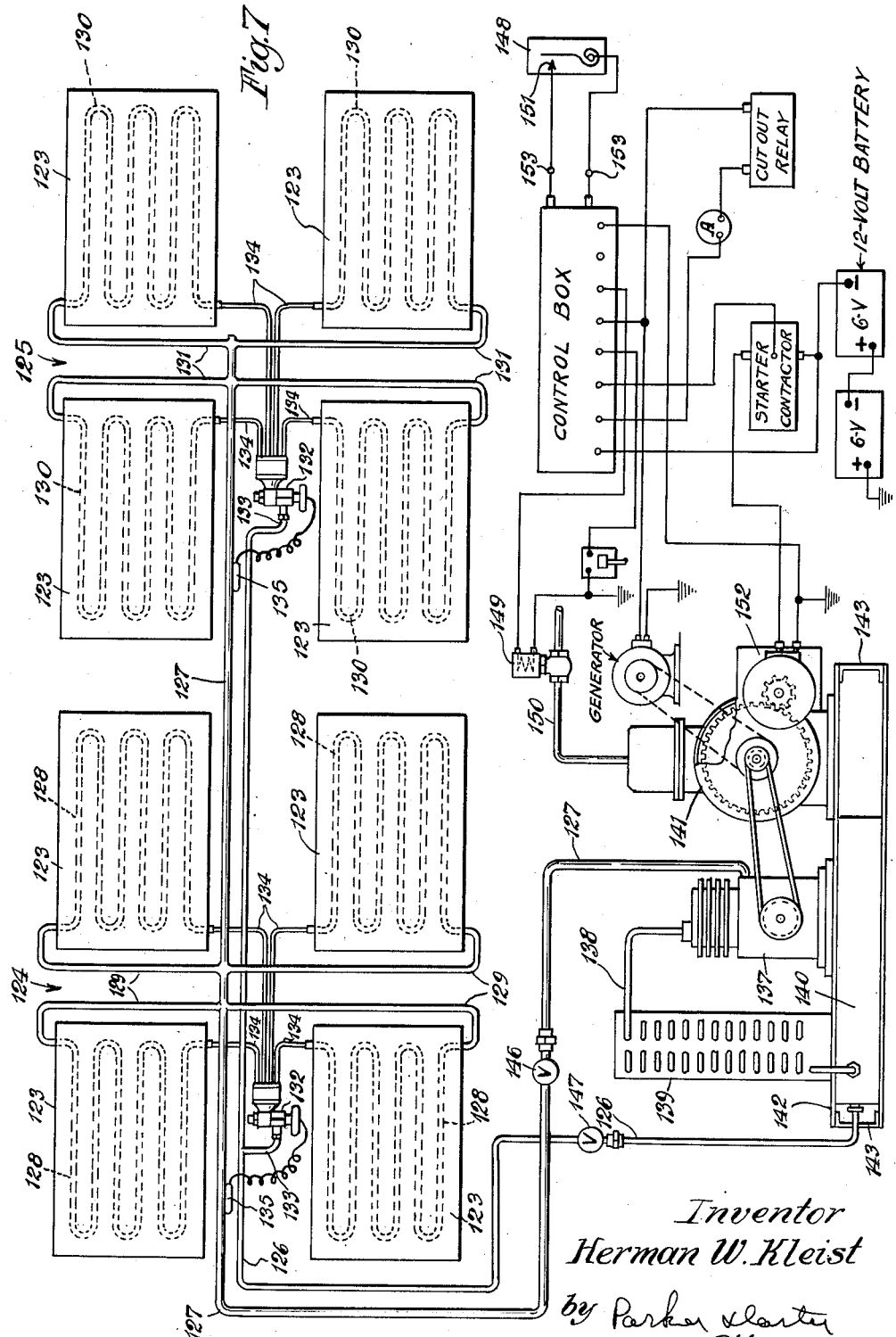

United States Patent Office 2,791,102
Patented May 7, 1957

2,791,102

REFRIGERATED CARS

Herman W. Kleist, Hollywood, Ill., assignor to Dole Refrigerating Company, Chicago, Ill., a corporation of Illinois Application September 10, 1954, Serial No. 455,258

4 Claims. (Cl. 62—4)

My invention relates to an improved refrigerating system for cars, trucks and the like.

It has long been desirable to provide a vehicle with suitable refrigerated compartments wherein perishable goods requiring substantially constant temperature for sustained periods of time may be transported. Numerous attempts have been made to provide and improve such systems. It has been proposed that a refrigerated vehicle carry its own refrigerant cycling assembly. Some designers have devised systems where such a cycling assembly is driven by the wheels of the vehicle. Such assemblies have the apparent disadvantage of being dependent upon the movement of the vehicle to actuate the cycling assembly. Other systems have been proposed wherein independent power units are mounted on the vehicle for driving the cycling assembly. Such units, of course, must be operated continuously or else require the attention of an attendant in operating the assembly. Further, upon power failure of either of these two aforementioned types of units, long delays were necessitated in order to make the required repairs of the power units. Such delays often entail several days or weeks of labor in repairing the units. In the case of a refrigerated car unit employing evaporating coils for a volatile refrigerant, these delays and attendant repairs of the power units require a shutdown of the refrigerating system. If a refrigerated car happens to be in a semi-arid section of the country, such as Arizona, New Mexico or Nevada, these shutdowns of the refrigerating unit carried aboard a vehicle often-times mean spoilage of goods carried in transit and a loss of thousands of dollars.

It is, therefore, desirable to provide a refrigerated vehicle which is not dependent upon the movement of the vehicle for its operation, to provide a refrigerating unit which may be operated independently of any attendant for long periods of time, to maintain a uniform temperature throughout the refrigerated vehicle, to maintain the evaporating coils of a vehicle carried refrigerating unit in heat transferring relationship to the interior of the vehicle for as long a time as possible upon failure of the source of power for the refrigerating unit, and to provide continuous service of a refrigerated vehicle.

With these and other desideratum in mind, it is a primary object of this invention to provide a refrigerating system for vehicles which will insure continuous service of the refrigerated vehicle for as long a time as possible and require a minimum of attention for its control and operation.

Another object and purpose of this invention is to provide a refrigerating system for vehicles which does not depend upon the supervision of an attendant for its operation.

Another purpose is to provide a hold-over system for freight cars in which, while the freight car carries its own power source, and refrigeration cycling equipment, it is necessary to operate it only at relatively wide intervals.

Another purpose is to provide such a system in which no operation of the cycling mechanism is necessary during a normal run or trip of a particular car, whereby the car may be loaded, transported to its destination, and unloaded, during the interval between successive actuation of the refrigerant cycling mechanism.

Another purpose is to provide an improved car structure in which a cycling mechanism is insulated and isolated from the interior of the car.

Another purpose is to provide a cycling unit for a refrigerated car which is so disposed with relation to the evaporator coils in the refrigerating space of the car that the cycling unit may be readily removed and another cycling unit inserted in its place.

Another purpose is to provide a refrigerating system in which a group of refrigerating plates or units is used to cool an interior space and in which one or more of the units can be cut out at the desire of the user.

Another purpose is to provide such an arrangement in which some of the plates or evaporators are automatically cut out, for example, in response to changes in temperature within the space to be refrigerated.

A further purpose is to provide an improved refrigerating system which may be operated independently of the movement of the vehicle.

Another purpose is to provide a refrigerating system wherein a self-contained cycling unit for the refrigerant is maintained in isolated relationship to the vehicle.

A still further object of this invention is to provide an improved arrangement of evaporator coils for the refrigerated compartment of the vehicle wherein means are provided for maintaining the temperature of the compartment at a substantially uniform degree throughout the interior of the compartment.

Other purposes will appear from time to time in the course of the specification and claims.

The present application is a continuation-in-part of my copending application, Serial No. 270,849, filed in the United States Patent Office on February 9, 1952, now abandoned.

I illustrate the invention more or less diagrammatically in the accompanying drawings, wherein:

Figure 1 is a vertical longitudinal section through a typical freight car;

Figure 2 is a section, with parts broken away, illustrating a typical cooling member;

Figure 3 is a section, on an enlarged scale, along the lines 3—3 of Figure 2;

Figure 4 is a wiring diagram illustrating one system of controls for the cycling unit;

Figure 5 is a diagrammatic illustration of a variant control arrangement;

Figure 6 is a view, with parts broken away, showing a different arrangement and system; and Figure 7 illustrates an operative diagram of the refrigerated unit shown in Figure 6.

Like parts are indicated by like symbols throughout the specification and drawings.

Referring to the drawings, A generally indicates a refrigerated freight car which includes insulated ends 1, 2 and insulating roof structure 3, an insulating floor structure 4, and insulated side wall structures 5. It will be understood that any suitable insulated structure may be employed, the details of car insulation not, of themselves forming a part of the present invention.

Referring to Figure 1, I find it advantageous to employ a separate cabinet or house, insulated from the interior of the car. Whereas such a house or compartment may be formed in a variety of ways, I illustrate, as an example, a compartment which includes an insulated bottom wall 6 and an insulated side wall 7. The compartment may extend entirely across the freight car, or it may be of less width than the interior of the freight car, depending upon the desire of the designer. With reference to Figure 1, the space within the compartment is insulated by the walls 6 and 7 from the interior of the freight car, but is preferably otherwise bounded by non-insulated wall areas. I illustrate, for example, an opening 8 in the end wall of the freight car which is closed by a louver member 9 which permits the entry or circulation of air. A similar louver member 10 is shown in one of the car side walls. The roof structure is provided with a non-insulated portion indicated at 11.

Within the housing thus formed I illustrate a compressor 12 which may be driven by any suitable motor 13. 14 is a return or suction duct extending to the compressor. The compressor delivers compressed refrigerant through the duct 15 to any suitable condenser 16 from which condensed refrigerant may flow to a receiver 17 for delivery through the pressure duct 18. It will be understood that any suitable means may be employed for circulating air or a suitable cooling medium about the condenser 16. Any suitable means may be employed for causing a pressure drop whereby the volatile refrigerant which flows through the duct 18 through the below described cold plates or evaporators may have its pressure reduced to the desired degree.

I illustrate diagrammatically any suitable pressure reduction valve or assembly 19. A common pressure reduction valve may be employed for groups of evaporators or for the entire evaporator system. An important feature of my invention, and one not shown in detail in Figure 1, is the provision of automatic and preferably heat-responsive means for varying the number of plates to which the volatile refrigerant flows. Because of lack of space, this feature is not shown in Figure 1 but is indicated diagrammatically in Figure 5, it being applicant's desire that Figure 1 be read as if the material in Figure 5 were included in it. It will be understood that when the motor 13 is driving the compressor 12, the gaseous refrigerant from the return duct or pipe 14 is compressed and condensed and delivered back toward the evaporators or cooling elements through the duct 18.

Whereas I may use a variety of evaporating elements, I prefer to employ hold-over vacuum plates in which an evaporator coil is surrounded by an eutectic and is held in adequate heat conducted relation with the preferably plane walls of a plate structure. Referring, for example, to Figures 2 and 3, I illustrate a plate for plane parallel walls 25 and 26 which, with circumferential side walls 27, form a closed container. Within this container is formed or bent any suitable evaporator coil 28. The evaporator coil receives a volatile refrigerant, at a reduced pressure from the supply pipe 18 through the pressure reduction structure 19. The individual members may be arranged in any suitable arrangement or circuit, but, for convenience, I illustrate them herein as arranged in series and connected by connecting ducts 30, the whole series eventually returning the evaporated refrigerant to and through the return pipe or duct 14. I find it advisable partially to exhaust the air within the individual unit. I may, for example, employ an aperture 31 which is closed by any suitable fitting 32 which is sealed after the eutectic has been added and the air has been partially exhausted. Preferably, I leave an empty space of ten percent or less of the capacity of the interior of the plate, rather than filling the plates completely with the eutectic.

The individual vacuum plates may be suspended conveniently from brackets 36 depending from the top of the refrigerated vehicle. If desired, suitable drip pans 38 may be suspended, by means of hangers 39, from the top of the vehicle. The drip pans serve as a convenient method for collecting moisture which may emanate from the vacuum plates B. Shown at 40 is a valve provided with a stop cock 41, thus providing a means for draining the drip pans 38.

It will be understood that whereas I show vacuum plates arranged along the top side of the vehicle compartment, the vacuum plates may be, with equal facility, employed along the sides of the vehicle.

In the use of my cooling system I find it desirous to employ a suitable time control. I illustrate herein what I may call a traveling container, which is shown as a freight car but which might be a truck or a room on a steamer. This traveling container has an insulated interior storage space, in the present example bounded by the insulated walls, roof and floor of a refrigerated flat car. This space I cool by plates or evaporators through which a volatile refrigerant may be cycled. The particular plates I illustrate herein are what I call vacuum plates, in which the evaporator coil 28 is largely surrounded by an eutectic. However, these plates or coils are not normally cycled during transportation. For example, in preparation for a railroad run, the eutectic of the plate may be initially frozen solid by the compressor-condenser-receiver assembly which I find advantageous to power by a diesel engine such as the engine 13 of Figure 1. The refrigerating effect of the eutectic is sufficient to maintain the desired temperature for a substantial period. On short runs it may not be necessary to operate the cycling assembly at all, but I prefer to provide one, and I show it in Figure 4. The time control, after a predetermined time lapse, may be actuated to start the diesel engine 13, which will then operate the compressor 12 to cycle the refrigerant through the evaporators to restore them to full cooling efficiency by refreezing the eutectic. In Figure 4, I illustrate more or less diagrammatically the necessary controls. For lack of space, because of the scale of the drawing, they are not shown in Figure 1. It will be understood, however, that the system shown in Figure 1 will be used in connection with the control assembly shown in Figure 4.

Referring to Figure 4, which illustrates the control circuit, 13 is a diesel engine to which liquid fuel may be supplied through the duct 51 controlled by the valve 52. The valve 52 may, for example, be controlled by the solenoid diagrammatically illustrated at 53. When the diesel engine 13 is operating, it serves to drive the compressor 12. The diesel 13 may be started by any suitable starter, diagrammatically illustrated at 54. Any suitable generator 55, driven by the diesel engine, may be employed to maintain a charge in the battery 56. 57 generally indicates a thermostat responsive to temperature within the car. It includes the heat responsive warping bar 58 and the normally fixed contacts 59 and 60.

Assume that a loaded car, with properly frozen eutectic charged vacuum plates, begins a trip. For a predetermined period of time no additional refrigeration is necessary, since the frozen eutectic maintains the interior of the car at the desired temperature. With reference to Figure 4, I may rely on a time device for initiating the cycling of the volatile refrigerant after a predetermined period, by starting the diesel engine 13 to recharge the plates by freezing the eutectic. For example, I illustrate any suitable clock 61, with its associated time switch 62, having the moving contact 63 and plurality of fixed contacts 64. Assume that it is desired to start the engine when the moving contact 63 reaches the fixed contact 64a. A suitable conductor is connected to the contact 64a and extends thence, as at 65, to the starter 54. 66 is any suitable vacuum control switch responsive to the pressure of the diesel.

It will be understood that as soon as the engine starts the switch 66 is operative to prevent further current flow through the conductor 65. The starting circuit is completed by the conductor 67, in which the battery 56 is included. 68 is any suitable switch for actually breaking the starting circuit. Thus it will be understood that when the movable contact 63 reaches the fixed contact to which the conductor 65 extends, for example, the contact 64a, the starter 54 is battery-driven to start the diesel 13. As soon as the diesel 13 starts, the pressure condition in the engine opens the switch 66 and prevents further flow of current through the starting circuit. Thus cycling of the volatile refrigerant through the plates is initiated after a predetermined time lag, which can be varied or controlled at the desire of the operator, through the clock 61 and the adjustable time switch 62.

If I wish, I can arrange to stop the operation of the diesel, and thus the cycling of the volatile refrigerant, after a further predetermined and controllable time lag. I may employ a stopping circuit including the conductor 70 which may, for example, be connected to the fixed contact 64b. The conductor 70 extends to the conductor 67, as at 70a, and forms a stopping circuit in which the solenoid 53 and the battery 56 are included. Thus, when the movable contact 63 reaches the fixed contact 64b, and assuming that the switch 70b is closed, the solenoid valve 53 is energized to close the valve 52, and to prevent, for the time being, any further flow of fuel along the pipe 51 to the diesel 13. It will be understood, of course, that as soon as the contact 63 passes the contact 64b, the solenoid is de-energized and the valve 52 is open, so that it will not prevent later starting of the diesel engine. It will also be understood that as soon as the diesel stops, the switch 66 is closed, ready for the next starting impulse. It will be understood, of course, that any suitable means may be employed for varying the setting of the time switch so that, at the will of the operator, the diesel can be started after a predetermined lag, and may again be stopped after a predetermined time of operation. Both the starting and the stopping circuits may also be put out of action by opening the manual switches 68 or 70b, respectively.

In place of, or as a supplement to, the time control I may employ a thermostatic control responsive to the temperature within the storage space. Assume that within a predetermined temperature range, the warping member 58 remains in the intermediate position in which it is shown in Figure 4. As long as it is in that position, the thermostat has no control over the operation of the cycling system. After a predetermined temperature increase, the warping bar 58 moves to the right to contact the fixed contact 60. When it does so, current flows from the battery 56 through the conductor 75, and the at that time closed switch 76, through the warping bar 58, the fixed contact 60, the switch 77, the conductor 78 and back through the conductor 65 and the vacuum controlled switch 66 to the starter 54. The result is the starting of the diesel 13, in response to the movement of the warping bar 58 against the hot contact 60. If the various switches are set to close the thermostatic circuits and to open the time control circuits, then the diesel will continue to operate until the warping bar 58 moves to the left, away from the hot contact 60 and against the cold contact 59. The contact of the warping bar 58 with the cold contact 59 closes a stopping circuit through the conductor 80 to the solenoid 53 and back along the conductor 70 to the battery 56 and back across the switch 76 to the warping bar 58.

Thus I show a time controlled starting circuit, a thermostat controlled starting circuit, a time controlled stopping circuit, and a thermostat controlled stopping circuit. By merely closing the proper switches, I can obtain the following operative features:

(A) I may start the engine and stop the engine, both by time control only.

(B) I may stop the engine and start the engine, solely by thermostatic control.

(C) I may start the engine by time control and stop the engine by thermostatic control.

I thus provide a very flexible operating system in which, by the mere manipulation of switches, the operator may determine whether he will rely solely on time control, solely on thermostatic control, or on a combination of time and thermostatic control. This is very helpful in connection with the different lengths of trip or run which may be made by a given refrigerating car, and, also, it permits the operator to relate his control system to the ambient temperature or changes in temperature to which the exterior of the car or truck is subjected.

As a further simplification, it will be understood that if all the switches are open except the starting switch, the engine can be started and permitted to run continuously until the end of the trip. This may be important, as where a low temperature is desired and goods are being handled which would not be handled by a higher temperature.

With reference to Figure 5, I illustrate the arrangement whereby a multiple of eutectic filled plates, indicated as the series B and the series C may be so connected to the cycling system as to be alternatively put in use or kept out of use. For example, the operator may wish to have all of the plates simultaneously functioning, or he may wish to cut out some of the plates. In Figure 5, I illustrate a single expansion valve 19 which receives a volatile refrigerant under pressure along the duct 18, and delivers it by the duct 103 to the bank B, and by the duct 104 to the bank C. The two banks then return the evaporated refrigerant along the return duct 14 to the compressor. In order to cut the bank C in or out, as desired, I may, for example, employ any suitable thermostat 106 with its fixed contacts 107, 108, and its temperature responsive contact 109 in circuit with any suitable power source, such as the battery 110. 111 generally indicates a solenoid controlled valve, there being two solenoid windings 112 and 113 respectively. When the warping contact 109 contacts the fixed contact 108, a circuit is closed through the solenoid winding 112 and the closed switch 114. The energization of the winding 112 actuates the valve, which may be set either to open or to close, depending upon the desire of the operator. At the same time, the switch 114 is opened to prevent drain on the battery 110. Assume that the winding 112 is effective to open the valve, and that the bank B is active. After a predetermined period, the warping bar 109 swings into contact with 107 and energizes the winding 113. The result is to close the valve, cutting out the bank C. At the same time, the switch 115 is opened, preventing drain on the battery 110.

Thus I illustrate a system whereby, of the total number of plates within the car or storage space, I may selectively cut some out, while leaving others connected in the cycling system. Figure 5 illustrates a circuit whereby this can be done thermostatically, but I do not wish to be so limited, as I may manually cut out some of the plates, if desired.

It will be understood that whereas I illustrate in Figure 5 the plate series B and C as forming individual controllable series, any other suitable arrangement or subdivision may be employed, whereby individual plates or groups of plates can be rendered inoperative in response to changes in temperature conditions.

Referring now to Figures 6 and 7, it will be seen that a modified form of a refrigerating system for vehicles may be advantageously employed. A refrigerated vehicle 120 is provided with an insulated compartment. Suitable inner walls 121 are preferably spaced inwardly from the outer walls 122 of the vehicle. It will be understood that suitable insulation may be inserted between the inner and outer wall, thus providing an insulated compartment for the storage and transport of goods. The compartment is refrigerated by a plurality of vacuum plates 123 which are the same type of vacuum plates utilizing a eutectic which is shown in Figures 1 through 5, a more precise showing being found in Figure 3. The vacuum plates 123 may be suspended from the top of the compartment as shown in Figure 1. Other suitable means may be employed for suspending the vacuum plates from the top of the compartment and, if desired, the vacuum plates may be disposed along the sides of the compartment. In this form of my invention, I prefer to arrange the vacuum plates 123 in groups. These groups are designated generally as 124 and 125 in Figure 7. Each of the groups 124 and 125 is adapted to receive liquid refrigerant from a supply conduit 126. Each of the groups is connected to a refrigerant return line 127, the vacuum plates of group 124 returning refrigerant from evaporator coils 128 through conduits 129 and the vacuum plates of group 125 delivering refrigerant from evaporator coils 130 to the return line 127 through conduits 131. Means are employed to deliver liquid refrigerant from the supply conduit 126 to the evaporator coils 128 and 130 of each group.

A multiple flow valve assembly 132 has conduit 133 in communication with the refrigerant supply conduit 126. Each multiple flow valve has supply conduits 134 leading to the evaporator coils of the plates in its associated group. Each valve 132 has a temperature responsive member 135 disposed in temperature sensing position along the return conduit line 127. Each of these temperature responsive members controls an opening in the valves 132 which establishes communication between conduits 133 and 134. The temperature responsive members 135 are adapted to selectively increase or diminish the opening in the valve 132 in accordance with the temperature in the return conduit 127. It will be understood by those skilled in the art that the precise type of valve employed to obtain this function may take one of many known forms. For example, suitable electrical, fluid or mechanical means may control the extent of opening in the valve 132 as determined by the temperature responsive members 135. By suitably positioning the temperature responsive members 135 of each group adjacent to the return conduits 129, the amount of liquid refrigerant delivered to each group may be varied in accordance with the temperature of each group. Thus it will be seen that a differential temperature control for the groups of plates is employed.

It will be appreciated that the precise temperature in the refrigerated compartment adjacent each group of plates will reflect a difference in temperature of the refrigerant in each of the evaporator coil return conduits 129 and 131 respectively. As the temperature in the compartment area adjacent the other group, the temperature in the return conduits of the group adjacent the area having the higher temperature will accordingly rise and thus increase the flow of refrigerant through that group's control valve. As a larger quantity of refrigerant is delivered to the evaporator coils of that group, the temperature in the compartment area adjacent that group will fall. Thus a differential control is provided for the groups of vacuum plates insuring substantial uniformity of temperature throughout the refrigerated compartment.

If desired, temperature responsive multiple flow valves operating in this manner may be employed with the groups of plates C and B shown in Figure 5. Such an employment may readily be accomplished by employing a multiple flow valve in the supply conduits of each of the groups or banks C and B with temperature responsive members disposed in the refrigerant return conduits of each group. For example, I have shown diagrammatically in Figure 5 a multiple flow control valve 132' inserted in the refrigerant supply conduit to each bank of plates B and C. A temperature responsive member 135' is positioned in each of the refrigerant return lines from each of the banks B and C. These members 135' are adapted to selectively vary the supply of refrigerant to each of the banks of plates B and C in the same manner that the temperature responsive members 135 control the valves 132 in Figure 7.

The refrigerant is cycled in the embodiment of Figures 6 and 7 in a manner similar to the cycling arrangement shown in Figure 4. Shown more or less diagrammatically is a compressor 137 receiving vaporized refrigerant from the return conduit 127 and delivering vaporized refrigerant by means of a conduit 138 to a condenser 139. As will be understood, the condenser delivers the refrigerant to the collecting tank 140 which is connected to the supply conduit 126. The compressor 137 is driven by a diesel engine 141 having suitable controls for actuation thereof. An important feature of this invention resides in mounting the condenser compressor and engine on a unitary frame member 142 having reinforcing frame members 143. By means of this unitary frame structure, the entire cycling unit including the diesel engine may be removed from the refrigerated vehicle. The unit is positioned in a compartment 144 preferably disposed at one end of the vehicle. The compartment 144 is isolated from the refrigerated compartment so that access may be had to the unit without disturbing the refrigerated compartment. A suitable closure member 145 may provide this access. In case of power failure of the unit, the entire unit may be removed from the vehicle through the area enclosed by closure member 145 and another substituted in its place. Valves 146 and 147 are disposed in the return conduit 127 and the supply conduit 126 outside of the refrigerated area. These valves are provided with detachable connections of any conventional construction to those portions of the conduits leading to and from the cycling unit.

By reason of the employment of the eutectic vacuum plates, removal of the cycling unit for a short period of time will not materially disturb the heat transferring relationship of the vacuum plates. The frozen eutectic in the vacuum plates maintains this relationship.

I have illustrated the diesel engine 141 as being preferably controlled by a heat responsive switch 148. The heat responsive switch 148 is adapted to start and stop the diesel engine. Essentially, this heat responsive switch energizes and de-energizes a solenoid actuated valve 149 controlling an oil supply line 150 for the diesel engine. When the temperature in the refrigerated compartment falls below a predetermined point, switch contacts 151 of the heat responsive switch will close and energize a starter motor 152 for the engine. Shown in outline form in the diagram are a throttle solenoid for controlling fuel delivered to the engine, any suitable generator provided with a cut-out relay, a control box and a battery for the electrical system. It will be understood that each of these elements is controlled by the temperature responsive switch 148. Detachable connections 153 are provided in the electrical lines leading from the opposed contacts of the heat responsive switch 148 so that if desired, the control box may be disconnected from the heat responsive switch. The control box may be mounted on the unitary frame 142 or may be mounted separately on a suitable portion of a wall of the car, in which case suitable detachable electrical connections may be inserted in the electrical conduits between the control box and oil supply valve, throttle solenoid, starting contact, cut out relay, battery, starter motor and generator.

Where I have shown a unitary frame member for supporting the diesel engine, compressor and condenser in Figure 7, it will be readily understood that this form of the cycling unit may be advantageously substituted for the cycling unit shown in Figure 4 with the attendant controls of Figure 4 employed to control the cycling thus substituted.

The use and operation of the invention are as follows:

The structure herein described and shown provides in various forms, a refrigerating or refrigerated container such as a car or truck body. The container, with its insulated walls, such as 1, 2, 3, 4, and 5, houses or surrounds a space in which material may be stored and transported in frozen condition. Preferably, the plates are, as shown in Figure 3, partially or substantially filled by an eutectic solution which is frozen solid before the car or container starts its run. If the material to be stored and transported in the container needs any precooling, then the frozen eutectic will absorb the extra heat from the goods transported, without raising the temperature of the storage space or of the container walls. For example, if the material is to be stored and transported at, say 0° F., and if it is put into the container or car at a temperature above 0° F., the eutectic is available to absorb the excess heat of the material transported and to bring it down to the desired temperature of, for example, 0° F. Thus material may be placed in the storage zone within the car, and be precooled there before or at the beginning of the transportation trip. It will make the trip, and end the trip, within a substantial time range, at its 0° F. temperature, there being no increase in the sensitive heat in the interior of the car or in the goods transported.

It will be understood that when the eutectic is completely frozen, the system again ceases to cycle. For this reason, I may employ a suitable thermostatic control responsive to the drop in temperature of the eutectic.

The multiple flow valves 132 which have been shown in Figure 7 serve to differentially control the amount of liquid refrigerant delivered to each group of vacuum plates, thus insuring that the individual groups will be supplied with refrigerant in accordance with the temperature of the compartment area adjacent the respective group. This results in a substantial uniformity of temperature throughout the refrigerated compartment. By utilizing a cycling unit which is mounted on a unitary frame member, I provide for removing the unit as an entity from the refrigerated vehicle. According to the desire of a person repairing a unit, the unit may either be replaced with another similar unit or may be repaired for re-employment in the same vehicle. While the cycling unit is being repaired or replaced, the frozen eutectic in the vacuum plates will maintain the temperature of the refrigerated compartment at the desired point for a sustained period of time.

From the foregoing it will be realized that I have provided an extremely versatile refrigerating system wherein the system is independent of the movement of the vehicle, may be operated independently of an attendant for sustained periods of time by reason of the time control and thermostatic controls, may maintain heat transferring relationship in case of power failure of the cycling unit by reason of the employment of the eutectic plates, and is capable of maintaining the temperature of an insulated storage space substantially constant throughout the storage area.

Although I have shown an operative form of my invention, it will be recognized that many changes in the form, shape and arrangement of parts can be made without departing from the spirit of the invention, and my showing is, therefore, to be taken as, in a sense, diagrammatic.

I claim:

1. In a refrigerated vehicle, wall, floor and roof elements of heat insulating structure surrounding and defining a space to be refrigerated, wall, floor and roof elements extending therefrom and surrounding and defining a work space, heat insulating partition means between said work space and the space to be refrigerated, a compressor and condenser power unit removably positioned in said work space, a wall of said work space having an aperture and a movable closure therefor, said aperture being dimensioned and positioned to permit the unitary insertion and withdrawal of said power unit therethrough, said power unit including a movable supporting base, a compressor on said base, a condenser on said base, and a motor on said base, said compressor, condenser and motor being mounted on said base for removal unitarily therewith, a driving connection between said motor and said compressor, a refrigerating plate exposed to the space to be refrigerated, said plate including a housing having a substantial body of eutectic therewithin and an evaporator coil in heat exchange relation with said eutectic, a cycling connection between said evaporator coil and the compressor and the condenser, said cycling connection including a main supply duct extending from the condenser, and a main return duct extending to the compressor, detachable valved connections intermediate said main ducts and the compressor and the condenser, a thermostat subject to the temperature of the space to be refrigerated, means for starting the motor and means for stopping the motor, a readily detachable electrical connection between said thermostat and said starting and stopping means, said starting and stopping means being removable from said work compartment unitarily with said power unit when said ducts are disconnected from the compressor and the condenser and when said thermostat is detached from said starting and stopping means.

2. In a refrigerated vehicle, wall, floor and roof elements of heat insulating structure surrounding and defining a space to be refrigerated, wall, floor and roof elements extending therefrom and surrounding and defining a work space, heat insulating partition means between said work space and the space to be refrigerated, a compressor and condenser power unit removably positioned in said work space, a wall of said work space having an aperture and a movable closure therefor, said aperture being dimensioned and positioned to permit the unitary insertion and withdrawal of said power unit therethrough, said power unit including a movable supporting base, a compressor on said base, a condenser on said base, and a motor on said base, said compressor, condenser and motor being mounted on said base for removal unitarily therewith, a driving connection between said motor and said compressor, a refrigerating plate exposed to the space to be refrigerated, said plate including a housing having a substantial body of eutectic therewithin and an evaporator coil in heat exchange relation with said eutectic, a cycling connection between said evaporator coil and the compressor and the condenser, said cycling connection including a main supply duct extending from the condenser, and a main return duct extending to the compressor, detachable valved connections intermediate said main ducts and the compressor and the condenser, a motor starter mounted on the power unit and operatively connected to the motor, motor stopping means mounted on the power unit, an electric control assembly mounted on the power unit, conductive connections between the control assembly and the starting and stopping means, electric power supply means for the starting and stopping means, in circuit with said control unit, a thermostat subject to the temperature of the space to be refrigerated, and a readily detachable conductive connection between the thermostat and the control assembly, whereby the control assembly, together with the starting and stopping means, are bodily removable with the power unit from said work compartment.

3. In a refrigerated vehicle, wall, floor and roof elements of heat insulating structure surrounding and defining a space to be refrigerated, wall, floor and roof elements extending therefrom and surrounding and defining a work space, heat insulating partition means between said work space and the space to be refrigerated, a compressor and condenser power unit removably positioned in said work space, a wall of said work space having an aperture and a movable closure therefor, said aperture being dimensioned and positioned to permit the unitary insertion and withdrawal of said power unit therethrough, said power unit including a movable supporting base, a compressor on said base, a condenser on said base, and a motor on said base, said compressor, condenser and motor being mounted on said base for removal unitarily therewith, a driving connection between said motor and said compressor, a refrigerating plate exposed to the space to be refrigerated, said plate including a housing having an evaporator coil in heat exchange relation therewith, a cycling connection between said evaporator coil and the compressor and the condenser, said cycling connection including a main supply duct extending from the condenser, and a main return duct extending to the compressor, detachable valved connections intermediate said main ducts and the compressor and the condenser, a thermostat subject to the temperature of the space to be refrigerated, means for starting the motor and means for stopping the motor, a readily detachable electrical connection between said thermostat and said starting and stopping means, said starting and stopping means being removable from said work compartment unitarily with said power unit when said ducts are disconnected from the compressor and the condenser and when said thermostat is detached from said starting and stopping means.

4. In a refrigerated vehicle, wall, floor and roof elements of heat insulating structure surrounding and defining a space to be refrigerated, wall, floor and roof elements extending therefrom and surrounding and defining a work space, heat insulating partition means between said work space and the space to be refrigerated, a compressor and condenser power unit removably positioned in said work space, a wall of said work space having an aperture and a movable closure therefor, said aperture being dimensioned and positioned to permit the unitary insertion and withdrawal of said power unit therethrough, said power unit including a movable supporting base, a compressor on said base, a condenser on said base, and a motor on said base, said compressor, condenser and motor being mounted on said base for removal unitarily therewith, a driving connection between said motor and said compressor, a refrigerating plate exposed to the space to be refrigerated, a cycling connection between said evaporator coil and the compressor and the condenser, said cycling connection including a main supply duct extending from the condenser, and a main return duct extending to the compressor, detachable valved connections intermediate said main ducts and the compressor and the condenser, a thermostat subject to the temperature of the space to be refrigerated, means for starting the motor and means for stopping the motor, a readily detachable electrical connection between said thermostat and said starting and stopping means, said starting and stopping means being removable from said work compartment unitarily with said power unit when said ducts are disconnected from the compressor and the condenser and when said thermostat is detached from said starting and stopping means.

References Cited in the file of this patent

UNITED STATES PATENTS

| | | |
|---|---|---|
| Re. 23,000 | Jones | May 11, 1948 |
| 2,268,667 | Mendez | Jan. 6, 1942 |
| 2,323,354 | Rees | July 6, 1943 |
| 2,328,472 | Lehane et al. | Aug. 31, 1943 |
| 2,410,449 | Kleist | Nov. 5, 1946 |
| 2,411,296 | Schweller | Nov. 19, 1946 |
| 2,461,760 | Newton | Feb. 15, 1949 |
| 2,479,128 | Maniscalco | Aug. 16, 1949 |
| 2,534,273 | Kleist | Dec. 19, 1950 |
| 2,608,067 | Alexander | Aug. 26, 1952 |
| 2,630,687 | Acton | Mar. 10, 1953 |
| 2,635,432 | Kleist | Apr. 21, 1953 |